(12) United States Patent
Goodman et al.

(10) Patent No.: US 7,848,501 B2
(45) Date of Patent: Dec. 7, 2010

(54) STORAGE ABUSE PREVENTION

(75) Inventors: Joshua T. Goodman, Redmond, WA (US); Carl M. Kadie, Bellevue, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/042,245

(22) Filed: Jan. 25, 2005

(65) Prior Publication Data

US 2006/0195604 A1    Aug. 31, 2006

(51) Int. Cl.
*H04M 3/42* (2006.01)
*G06F 15/16* (2006.01)

(52) U.S. Cl. .............. 379/201.05; 379/201.01; 379/201.02; 707/607; 707/781; 709/231

(58) Field of Classification Search ........ 709/232; 707/200, 607, 781; 379/201.01, 201.02, 379/201.05
See application file for complete search history.

(56) References Cited

U.S. PATENT DOCUMENTS

| | | | |
|---|---|---|---|
| 6,922,781 B1* | 7/2005 | Shuster ............... | 713/165 |
| 6,944,765 B1* | 9/2005 | Rose et al. ........... | 713/181 |
| 7,032,114 B1* | 4/2006 | Moran ................ | 713/187 |
| 2002/0099616 A1* | 7/2002 | Sweldens ............ | 705/26 |
| 2002/0128984 A1* | 9/2002 | Mehta et al. ......... | 705/71 |
| 2002/0194100 A1* | 12/2002 | Choban et al. ....... | 705/36 |
| 2003/0133459 A1* | 7/2003 | Siddiqui et al. ..... | 370/395.21 |
| 2004/0230386 A1* | 11/2004 | Peters ................. | 702/57 |
| 2005/0021649 A1 | 1/2005 | Goodman et al. | |
| 2006/0026213 A1* | 2/2006 | Yaskin et al. ........ | 707/200 |
| 2006/0031464 A1* | 2/2006 | Bowman et al. ..... | 709/224 |
| 2006/0048229 A1* | 3/2006 | Bronstein ............. | 726/25 |
| 2006/0064759 A1* | 3/2006 | Agranat ............... | 726/26 |
| 2006/0083186 A1* | 4/2006 | Handforth et al. ... | 370/310 |

OTHER PUBLICATIONS

Lane et al, "An Application of Machine Learning to Anomaly Detection". 20th Annual National Information Systems Security Conference, vol. 1, pp. 366-380. Feb. 1997.*
Bergmair et al, "Towards human interactive proofs in the text-domain". In Proceedings of the 7th Information Security Conference (ISC'04), Springer Lecture Notes in Computer Science, Sep. 2004.*
Abadi et al, "Moderately Hard, Memory-Bound Functions". Proceedings of the 10th Annual Network and Distributed System Security Symposium, 2003.*

* cited by examiner

*Primary Examiner*—Ahmad F Matar
*Assistant Examiner*—Khai N Nguyen
(74) *Attorney, Agent, or Firm*—Lee & Hayes, PLLC

(57) ABSTRACT

The subject invention provides a unique system and method that facilitates mitigation of storage abuse in connection with free storage provided by messaging service providers such as email, instant messaging, chat, blogging, and/or web hosting service providers. The system and method involve measuring the outbound volume of stored data. When the volume satisfies a threshold, a cost can be imposed on the account to mitigate the suspicious or abusive activity. Other factors can be considered as well that can modify the cost imposed on the cost such as by increasing the cost. Machine learning can be employed as well to predict a level or degree of suspicion. The various factors or the text of the messages can be used as input for the machine learning system.

20 Claims, 6 Drawing Sheets

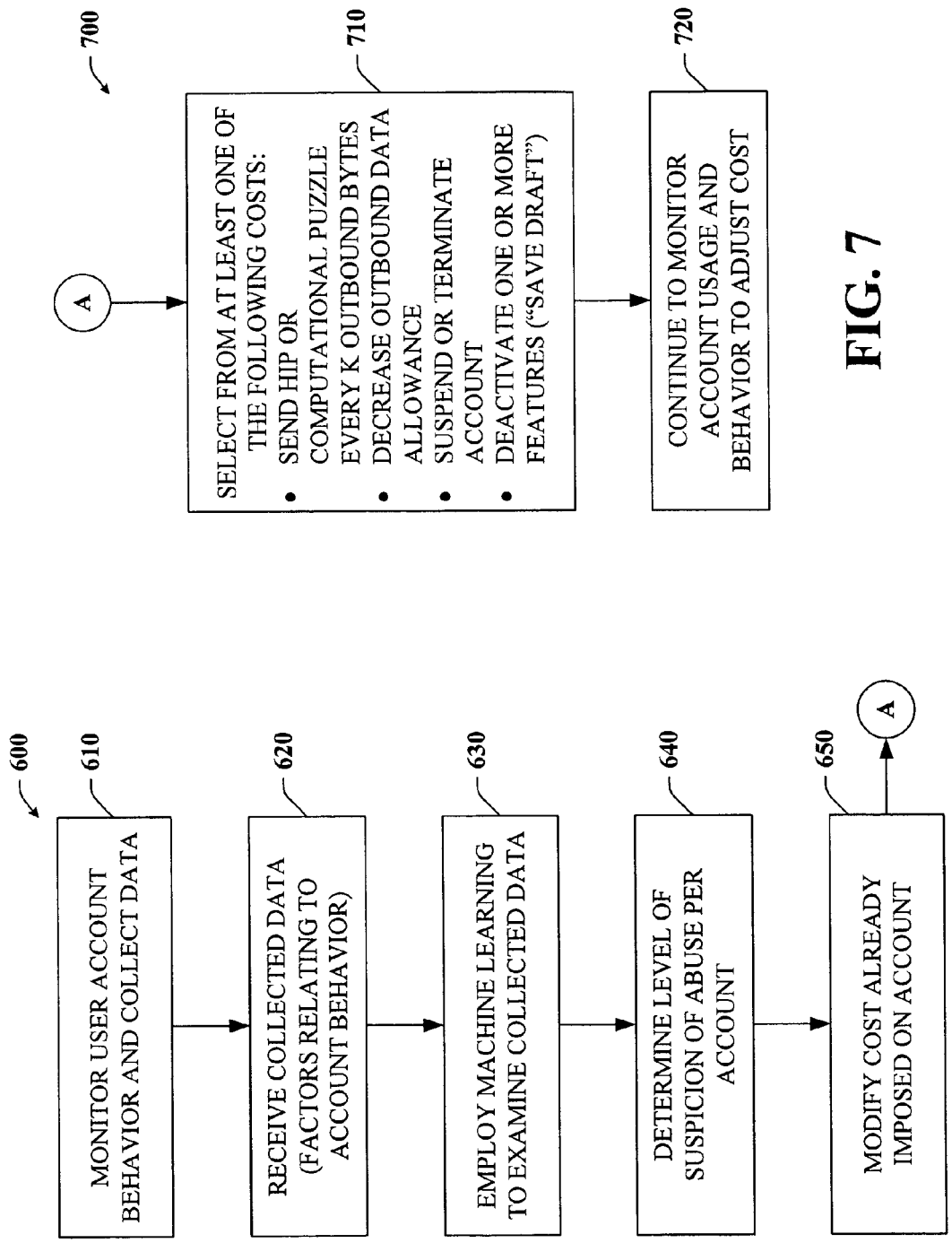

STORAGE ABUSE PREVENTION

TECHNICAL FIELD

The subject invention relates generally to online storage and in particular to detecting and mitigating abuse of free storage provided by messaging services.

BACKGROUND OF THE INVENTION

Many users desire free, reliable storage over the Internet. To attract and accommodate users, several online messaging services provide free user accounts and free storage to their account holders. Most services include at least 2 MB storage capacity with each account that would presumably be used to save important messages and/or any related attachments. Unfortunately, such storage can be used for many things not intended by the supplier of the system such as storage of pornographic images or videos, possibly illegal in nature, storage of illegally copied software ("warez"), storage of MP3s or other audio files (possibly in violation of copyright laws), and/or storage of generic data (e.g., to back up important files from a hard drive).

Users may store this data for their own use, or may store it to share and trade with or sell to others. Users generally prefer this form of storage both because it is free and because it offers a layer of anonymity. Unfortunately, such storage can become very expensive for the message service provider (MSP) because users fill up their accounts with large amounts of data quickly. In addition, in many scenarios, such as when the data is accessed in an automated way, the provider loses a revenue opportunity, since the automation software will likely not show ads in a way that the downloader can see them.

To some extent, such storage abuse appears inevitable. Before most MSPs added some type of human intervention (e.g., solving a human interactive proof (HIP) (also called a CAPTCHA or reverse Turing test)) to the account set-up process for their small storage (2 MB) accounts, their systems were frequently abused. Users would create hundreds or thousands of accounts and then store data in them (split up into parts) using automation both for splitting and for re-assembly. Large operating system or application files were commonly split and perhaps illegally shared in this way. The HIP effectively made this too much effort because creating the hundreds or thousands of accounts became too annoying.

Recently, storage sizes offered by at least a few MSPs have been significantly increased or are expected to drastically increase in the near future. For instance, a few MSPs are offering 250 MB of free storage. Another is offering 1 GB of free storage. Unfortunately, this MSP already has a File System named after it, which is an automated storage system that abuses its accounts.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate monitoring user account activity for suspicious behavior to mitigate storage abuse. More specifically, the system and method can impose a cost on the user (user account) when suspicious behavior is detected. Such behavior can be determined in part by measuring the outbound volume of stored data at any given time or over a period of time. When the volume of outbound stored data satisfies a threshold, a cost can be imposed on the user. The cost can be a human interactive puzzle (HIP) or a computational puzzle. In some cases, users may be willing to pay the cost of solving a HIP since one HIP per MP3, for example, may seem relatively cost effective. To avoid this type of scenario, the cost can be imposed as a delay. For example, the user may not be able to download more than 1 MP3 file per 5-minute period. Other costs can be imposed as well such as suspending the user account or imposing a monetary fee on the user.

According to one aspect of the invention, outbound stored data can be measured in a number of ways. One approach involves measuring the number of bytes leaving (e.g., being sent from) an account. Another approach involves measuring the number of files leaving the account. Stored data can leave an account by being downloaded by a user, by being forwarded by a user, or by being included in a message that is replied to by a user. Attachments can also be measured to determine the volume of outbound data.

According to another aspect of the invention, machine learning can be employed to facilitate detecting storage abuse. In particular, machine learning can be used to detect a level of suspicion associated with any user account. The level of suspicion can be computed by analyzing a number of different factors that indicate the likelihood that any one account is a shared account and is abusing the free storage provided by the messaging service provider. Once determined, the level of suspicion can be employed to modify the cost imposed on the user. Alternatively, for each factor detected, the cost can be raised as appropriate.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 6 is a flow diagram illustrating an exemplary methodology that employs machine learning to facilitate mitigating storage abuse in accordance with an aspect of the subject invention.

FIG. 7 is a flow diagram illustrating an exemplary methodology that facilitates mitigating storage abuse in accordance with an aspect of the subject invention.

DETAILED DESCRIPTION OF THE INVENTION

Figure 1:
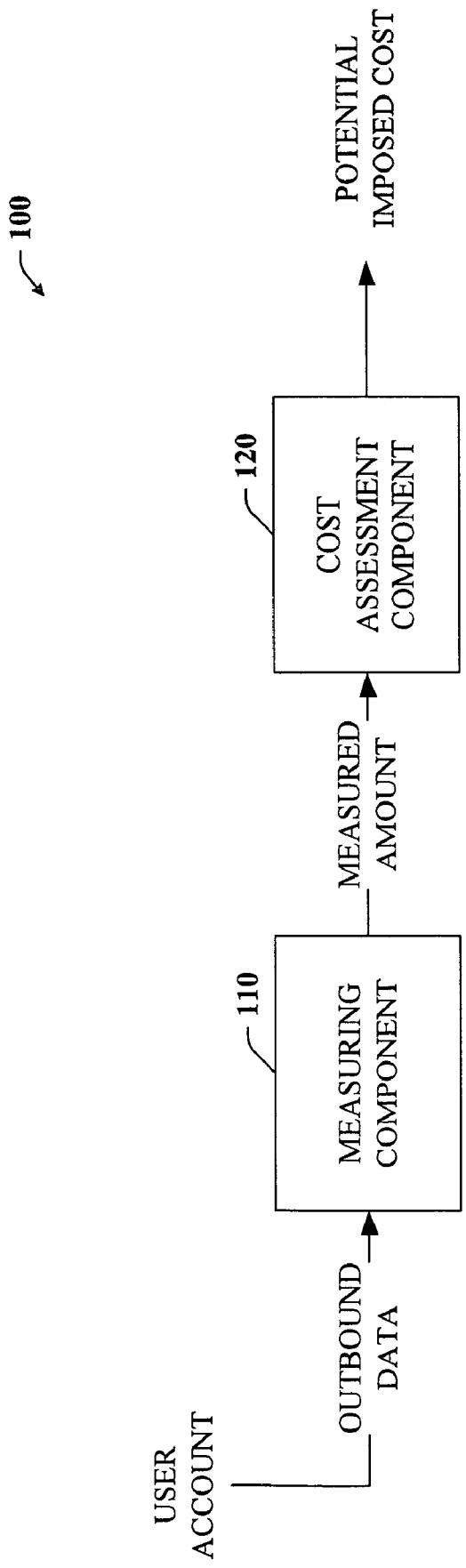
FIG. 1 is a block diagram of a system that mitigates storage abuse in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating input or training data for a machine learning system that mitigates storage abuse. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Also as used herein, the term message or messaging can be used to refer to email messages, instant messages, chat messages, blog entries, and/or web hosting messages, as provided by the respective service providers.

There are basically two abusive activities that can be performed against a large storage messaging system: data can be stored for the user's own benefit or use such as a personal file store; or the data can be stored for the use of others (e.g., kiddy porn, warez, MP3s, movies, pictures, etc.). For either one of these, there are basically two approaches that a user and potential abuser can take: store the data in a more or less native state such as an MP3, JPG, etc.; and store the data in an encoded form, whereby the data is encoded as text or some other innocuous looking message type.

In addition, when storing data for other people, there are basically two ways to get the data to them: forward it to them or give them your password and let them read what is in the account at their leisure. Thus, there are at least 6 possible scenarios to detect:

(a) Data stored for personal use in its native form;
(b) Data stored for personal use in an encoded form;
(c) Forwarding data stored for others' use to others in its native form;
(d) Allowing others to have access to data stored in its native form by giving them the password (e.g., porn, warez, MP3s, movies, etc.);
(e) Forwarding data stored for others to others that has been encoded; and
(f) Allowing others to have access to data stored in its encoded form by giving them the password (e.g., porn, warez, MP3s, movies, etc.).

Scenarios a, c, and d which involve storing data for personal use or the use of others in its native form can be readily detected. For instance, imagine there are a large number of suspicious files of a suspicious file type (e.g., GIF, JPG, MP3, .MOV, etc.) stored by the user. A list of these suspicious file types can be made. Every 100 times, for example, the user downloads (a, d) or forwards (c) one of these suspicious file types, the system and/or method of the subject invention can send a HIP or re-HIP the user (account holder).

Scenarios b, e, and f can be addressed in the following manner. For scenario b, the system and/or method can send a HIP to the user for every n bytes that are downloaded, where n might be 20 or 50 MB, for example (n is an integer greater than zero). For scenario e, the user can be sent a HIP to solve for every z bytes that he/she forwards, where z could be 20 or 50 MB, for example. Finally, in scenario f, the user can also be sent a HIP that must be solved for every w bytes that he/she downloads (e.g., every 20 or 50 MB). Hence, even when the data is stored in encoded form, abuse can be prevented, since these likely abusers can still be detected by counting the bytes of data rather than the form of the data. (However, we may set the thresholds lower for suspicious file types, e.g. MP3s, then we would for less suspicious types, e.g. text.)

As the level of suspicion fluctuates, the number of times or the number of bytes that can trigger another HIP to be sent, for example, can change as well. For instance, when the various factors cause greater suspicion, the user can be sent a HIP for every 10 MB of outbound data; whereas a less suspicious user can be required to solve a HIP for every 60 MB.

Referring now to FIG. 1, there is a general block diagram of a storage abuse prevention system 100 in accordance with an aspect of the subject invention. The system 100 includes a measuring component 110 that can measure an amount (or volume) of outbound stored data per user account. The measured amount can be communicated to a cost assessment component 120 that can determine whether to impose a cost on the user account based on the measured amount of outbound data.

Outbound stored data can be described as the number of files or the number of bytes that have been downloaded by the account or forwarded to others. For example, when a user downloads a file such as an MP3 received in an email or instant message, the measured amount of outbound data can be the total size of the file or can be a cumulative total of bytes or files downloaded within a relatively short period of time. This period of time can be determined by the service provider. Replied-to messages can also be included in the volume of outbound stored data. By way of example, imagine that a large message is in a user's inbox. When the user replies to it, including all of the previous text, a large amount of stored data will have been sent. Thus, replying to messages can be another tactic to transfer large amounts of data to others.

The imposition of a cost can be triggered by one or more thresholds or factors being satisfied or detected, respectively; and the cost itself can be monetary or non-monetary based. For instance, the cost can be a delay implemented to reduce the amount of outbound data. That is, instead of allowing a user to download unlimited volumes of stored data, the system can restrict such operation to 5 MB or 1 file (or one file type—e.g., MP3) per 10 minute period. Alternatively or in addition, the user can be required to solve a HIP every time the cost is triggered or at set intervals (e.g., time intervals or every p MB of outbound data).

Figure 2:
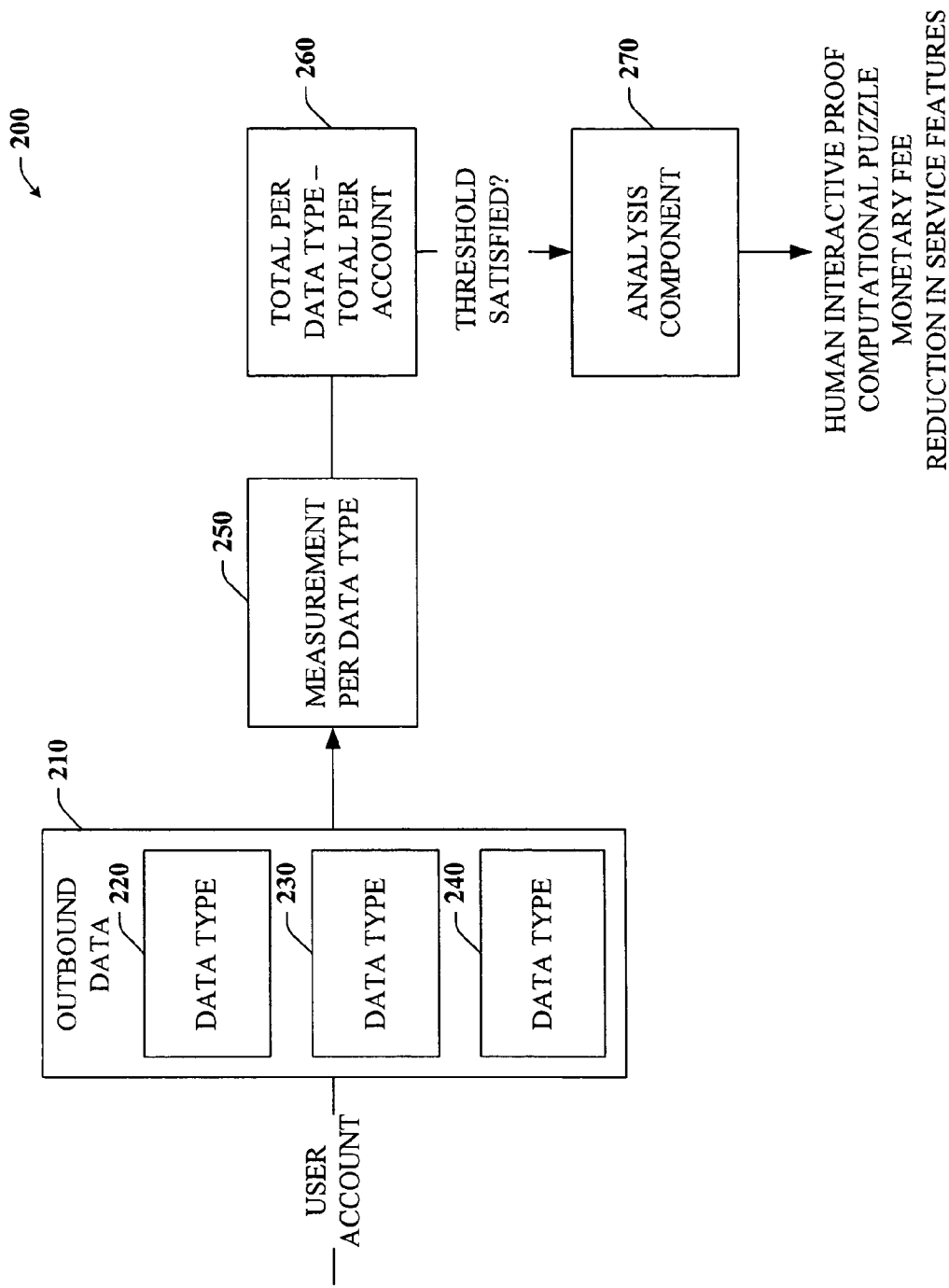
FIG. 2 is a block diagram of a system that mitigates storage abuse in accordance with an aspect of the subject invention.

Referring now to FIG. 2, there is illustrated a block diagram 200 that demonstrates the mitigation of storage abuse with respect to free storage provided by message service providers. The diagram 200 depicts outbound data 210 per user account which can be measured according to data type (DATA TYPE$_1$ 220, DATA TYPE$_2$ 230, and DATA TYPE$_D$ 240, where D is an integer greater than or equal to one). Some data types can be more suspicious than others. For example, image, picture, audio, sound, and video related data types can be more suspicious than other types. However, substantially all types of data can be considered since abusers are more likely to attempt to disguise the more suspicious data types as non-suspicious types.

A measurement 250 of the outbound data per data type as well as a total count per user account 260 can be obtained and communicated to an analysis component 270. The analysis component 270 can determine whether the count per data type and/or the total count for the account satisfy one or more thresholds. If so, then a cost can be imposed on the account. The cost can include at least one of the following: at least one HIP, at least one computational puzzle, a monetary fee, and/or a reduction in or a suspension of at least one feature provided by the service (e.g., delay in outbound data, lowering outbound allowances, decreasing storage size, suspending "save draft" feature, etc.).

In addition to monitoring user accounts for the volume of outbound data, several other factors can indicate a likelihood of abuse. When detected, any found factors can be employed to increase or otherwise adjust the cost imposed. This can be done in a deterministic way. For example, for each factor detected, the volume permitted per HIP can be reduced by half. Thus, if a user is required to solve a HIP for every 20 MB of outbound data, then the detection of as few as one additional factor may cause one HIP to be sent for every 10 MB of outbound data, and so on.

Figure 3:
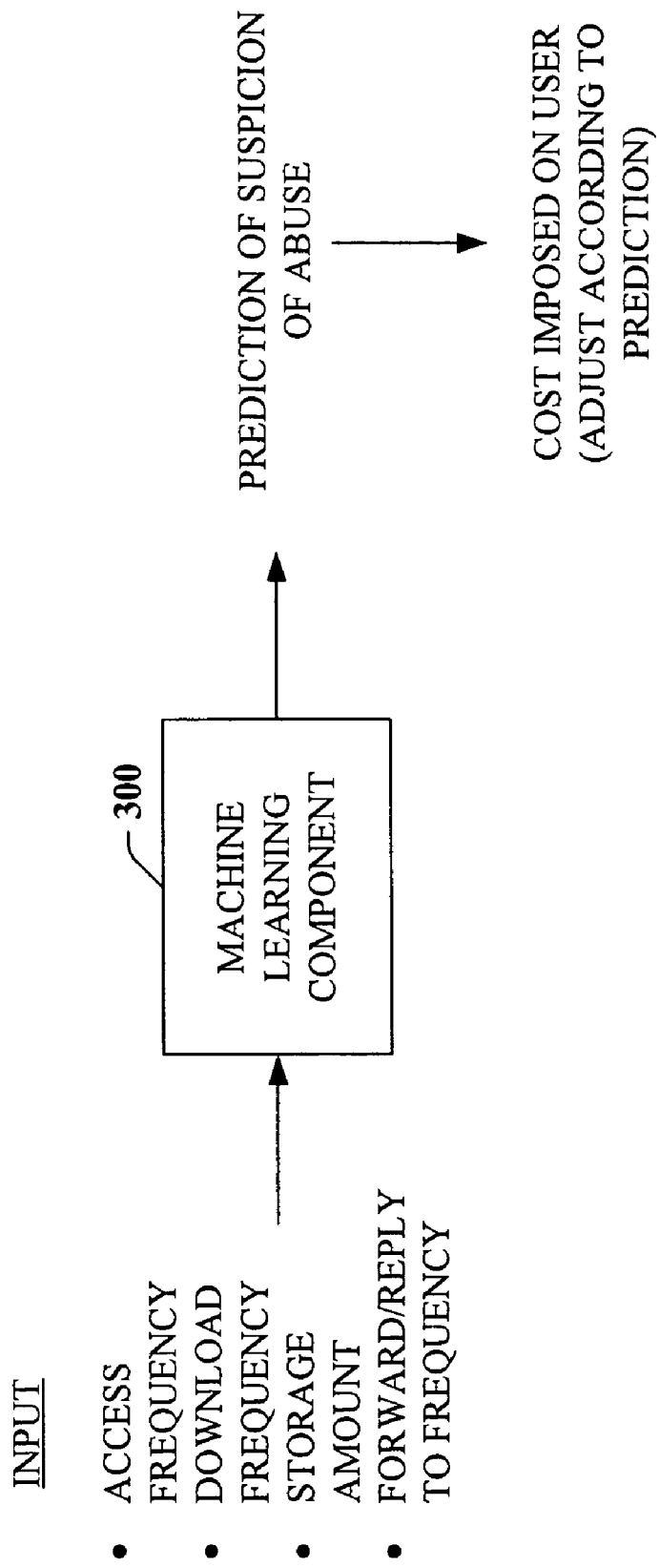
FIG. 3 is a block diagram of a system that employs machine learning to mitigate storage abuse in accordance with an aspect of the subject invention.

Alternatively, any detected factors or text of messages being downloaded (or forwarded) can be employed as input to a machine learning component 300 as illustrated in FIG. 3. The machine learning component 300 can employ discriminative training such as an SVM, perceptron, neural network, maximum entropy, or logistic regression model.

The factors can relate to access frequency of an account and/or of messages, download frequency, storage amount reached and the rate at which it is reached, and/or forward/reply-to frequency. The machine learning component 300 can take such factors or the text of messages being downloaded as input to determine a level of suspicion per user account. The level of suspicion can serve as a prediction or probability that the user account is being abused, and thus can be employed to adjust the cost imposed on the account. In practice, for example, if the machine learning component 300 predicts a high degree of suspicion, the account can be sent a HIP more often. In addition, computational puzzles can be sent more often or the maximum download rate can be reduced.

More specific examples of factors that can be considered to facilitate identifying a potential abuser can include:

The account is logged into from many different IP addresses (indicative of a shared account, scenarios d and f);

The account is logged into from many different and disparate IP addresses (e.g., IP addresses from different regions or with different high order bits—indicative of a shared account);

The account is logged into from different IP addresses during a short period;

Detect that the machine is the same through the use of cookies or GUIDs (globally unique identifiers), even if the IP address is different (e.g., a roaming laptop or static machine with dynamically assigned IP address may change IP addresses on a regular basis, so using cookies or client GUIDs can detect that this is really many different machines.) While there can be legitimate reasons to access an account from multiple machines, it can also be a sign of a shared account;

Many messages are read (opened), forwarded or replied-to in a short period;

Large percentage of messages (data) is received from one IP address or range of IP addresses (typical of mail being placed into the account automatically, though also typical of some legitimate forwarding behavior);

Large percentage of messages (data) sent to the same domain or worse, to the same account (typical of scenarios c and e);

A large number of accounts are logged into from an IP address that is not a known proxy or that is a known dialup/DSL/cable modem (usually belongs to one user);

An account that is nearly full;

An account that has filled up quickly;

An asymmetry in volume of data (much more data/messages forwarded than received; much more data/messages downloaded than received);

Excessive access to older messages—frequency satisfies a threshold to indicate "excessiveness". (Message access is strongly concentrated on very new material. For file access, this is less so. If they try to re-write messages to make it look new, they will be trapped by the bandwidth (x bytes of outbound data) limitations); and/or Multiple access of the same message. (A lot of messages are only read once. In contrast, files tend to be read over and over again);

In addition, a message service provider can verify whether the message client is who it represents itself to be. For example, the message provider can ask the client's browser any number of questions to distinguish a real browser as a client from some other software pretending to be that client. For example, if the client claims to be ABC Browser, then ask it questions to determine if it really behaves like ABC Browser. If the questions are answered correctly, then the identity of the browser can be confirmed. In practice, some commonly known browsers have specific attributes unique to them. Ability to return screen width is one such attribute. If no response is given, then it can be concluded that the client is not who it claims to be and is more likely to be an abuser.

Free storage on messaging systems can also be mistreated as file storage systems when users simply write to the "file system". Such practices can be detected, for instance, by monitoring the use of "save draft" feature of some messaging systems. Any observed over use of "save draft" can be handled by limiting the number of times it can be used, reducing the storage capacity, and/or at the extreme, not allowing drafts to be saved. Another way of writing to the system can be to send the data (in messages) directly to one's self. This could be from/to the same account or from accounts that reference the same credit card or address or user name. Other detection methods include using cookies to find two accounts being employed from the same machine. To further prevent users from accessing the same account from multiple machines or locations, a login system that only allows a single access to the account at a time can prevent two people from accessing the same account at the same time.

Various methodologies in accordance with the subject invention will now be described via a series of acts; it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figures 4, 5:
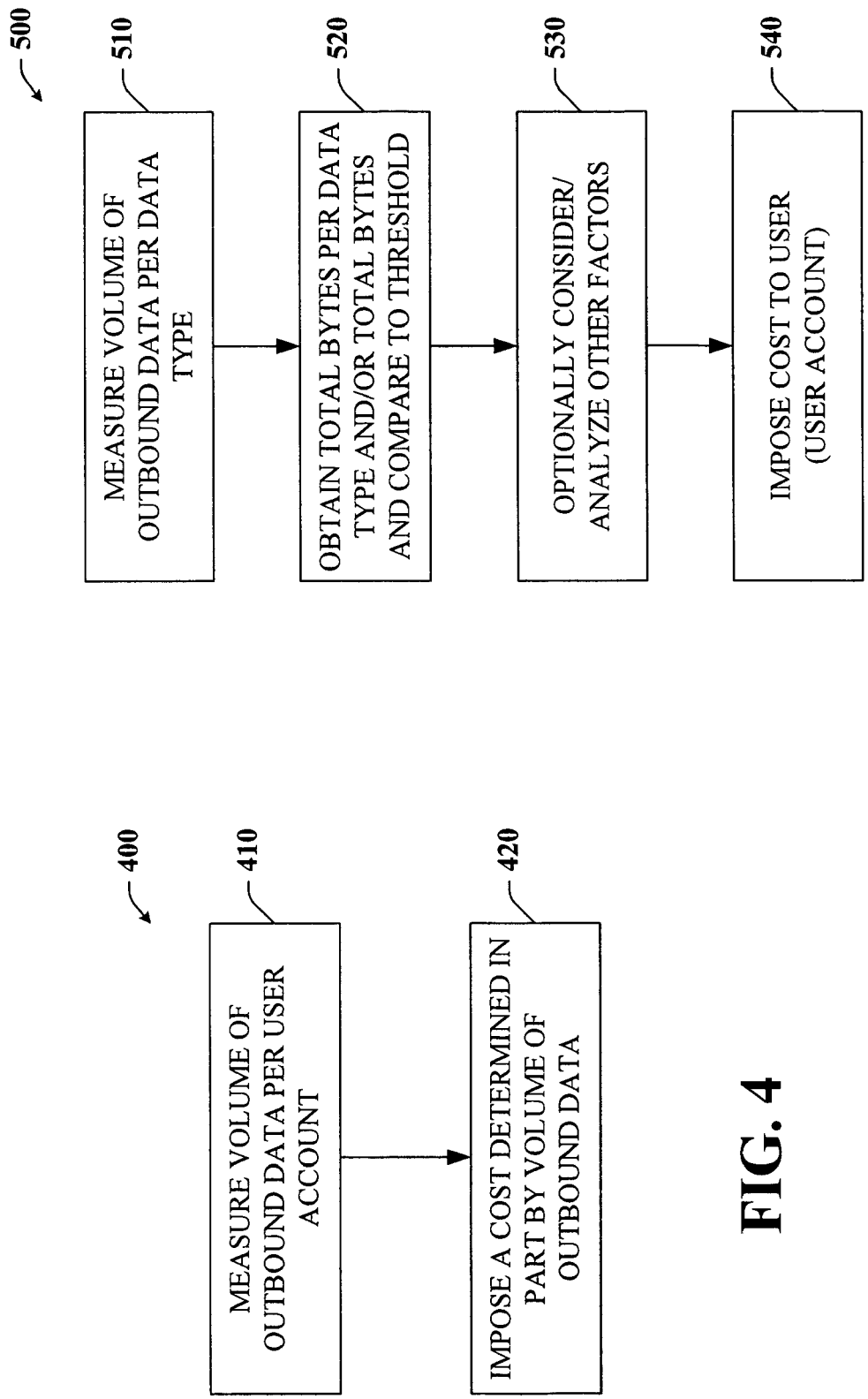
FIG. 4 is a flow diagram of an exemplary methodology that facilitates mitigating storage abuse in accordance with still another aspect of the subject invention.
FIG. 5 is a flow diagram of an exemplary methodology that facilitates mitigating storage abuse in accordance with an aspect of the subject invention.

Referring now to FIG. 4, there is a flow diagram of an exemplary method 400 that mitigates storage abuse in accordance with an aspect of the subject invention. The method 400 involves measuring a volume of outbound stored data per user account at 410. At 420, a cost can be imposed that is determined in part by the volume of outbound data. Outbound stored data can be characterized as data that is downloaded, forwarded, or included in a message that is replied-to by a user. It should be appreciated that new messages created from scratch (e.g., not a reply to or forward of a message) does not contribute to the volume of outbound stored data. In such cases, the outbound volume of stored data is considered to be zero.

FIG. 5 demonstrates another exemplary method 500 that facilitates reducing abuse of free storage provided by message service providers according to an aspect of the invention. The method 500 involves measuring a volume of outbound data per data type at 510. Examples of data types that may be particularly suspicious include MP3, JPG, GIF, MOV, WAV, and the like. At 520, the total bytes per data type or for all data types can be obtained for analysis. For instance, the byte counts can be analyzed to determine if they satisfy a respective threshold. Other factors observed with respect to a particular user account can be considered and analyzed as well in addition to the byte count(s) (at 530). At 540, a cost can be imposed on the user account. The cost can be sending a HIP or computational puzzle to the user account for every t bytes of outbound data. The HIP can be delivered via email, for example. Other types of costs include imposing a delay between p bytes of outbound data to slow down the outflow of data, thus making it less convenient for abusive practices, reducing the maximum download rate, and/or reducing the amount of free storage available to the account. Under more extreme circumstances, the user account can be suspended or shut down.

Referring now to FIG. 6, there is a flow diagram of an exemplary method 600 that makes use of machine learning to mitigate storage abuse in accordance with an aspect of the invention. The method 600 includes monitoring a user account's behavior and collecting data relating thereto at 610. At 620, the collected data can be received as input to a machine learning system. The data can related to various factors observed in connection with the user account that may indicate a likelihood of abuse by the account holder. At 630, the machine learning system can be employed to examine the collected data in order to facilitate predicting a level of suspicion. The level or degree of suspicion can be determined per account at 640. Depending on the level of suspicion, the cost imposed on the user account can be modified at 650 to increase usage restrictions on the account or to increase the frequency at which HIPs or computational puzzles are required to be solved.

As shown in the flow diagram 700 in FIG. 700, at least one of the following costs can be selected and imposed on the user account at 710: sending a HIP or computational puzzle every k bytes of outbound data; decreasing the outbound data allowance; suspending the account; and deactivating one or more features such as "save draft". Other costs or penalties can be imposed as well such as monetary-based fees. At 720, the method 700 can continue to monitor the user account activity to adjust the cost accordingly.

Figure 8:
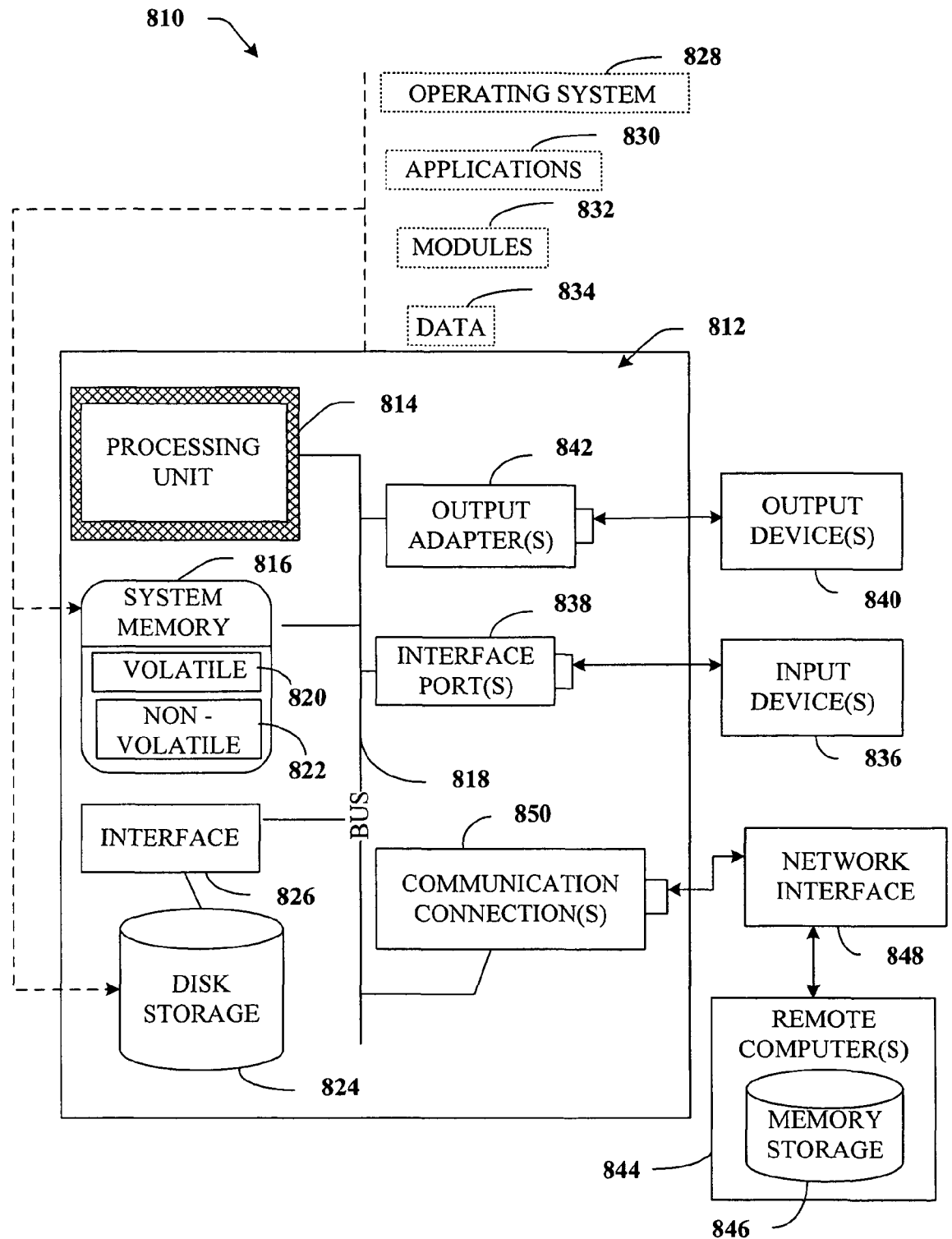
FIG. 8 illustrates an exemplary environment for implementing various aspects of the invention.

In order to provide additional context for various aspects of the subject invention, FIG. 8 and the following discussion are intended to provide a brief, general description of a suitable operating environment 810 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a processor;
    one or more memories communicatively coupled to the processor, the one or more memories having stored instructions that, when executed at the system, configure the system to implement:
    a measuring component that determines a level of suspicion that a user account file storage space is being abused, the measuring component measuring an amount of outbound data sent by the user account according to each of a plurality of file types, the measuring component measuring an amount of outbound data per file type and a total amount of outbound data per the user account, in determining the level of suspicion, wherein the measuring component is configured to compare the amount of outbound data per file type and the total amount of outbound data per the user account to one or more threshold values; and
    a cost assessment component that imposes a cost on the user account when the account's determined level of suspicion satisfies a threshold value, the cost including at least a delay imposed on download requests received through the account, wherein the amount of delay dynamically adjusts based on the level of suspicion.

2. The system of claim 1, wherein the cost further comprises at least one of the following: a computational puzzle, or a human interactive proof.

3. The system of claim 2, wherein the human interactive proof is delivered to the user via email.

4. The system of claim 1, wherein the cost is imposed on the user account when the account's measured amount of outbound data satisfies the threshold.

5. The system of claim 1, wherein the level of suspicion is based in part upon the amount of outbound data sent by email.

6. The system of claim 1, wherein the level of suspicion is based in part upon the amount of outbound data sent by at least one of an instant messaging or a chat application.

7. The system of claim 1, wherein the level of suspicion is based in part upon the amount of outbound data sent via at least one of a web hosting service and a blogging service.

8. The system of claim 1, wherein the determined level of suspicion is a probability indicating the level of suspicion that the user account file storage space is being abused.

9. The system of claim 1, wherein the file types comprises any of the following: music files, joint photographic experts group (JPG) files, bitmaps (BMP), wave (WAV) files, executable (EXE) files, multimedia files, image files, or audio files.

10. The system of claim 1, wherein the level of suspicion is based in part upon a total amount of bytes of outbound data from the user account.

11. The system of claim 1, further comprising a machine learning component that detects at least one of storage volume or outbound volume per user.

12. The system of claim 11, wherein the machine learning component employs discriminative training to facilitate predicting a level of suspicion of abuse.

13. The system of claim 1, the level of suspicion is based in part upon the amount of user account access frequency, download frequency, forward message frequency, reply-to message frequency, save-draft frequency, log-in location, and asymmetry in received volume to outbound volume.

14. A computer implemented method, operable on a computer processor, that mitigates storage abuse of communication systems, the method comprising:
monitoring, by a computing system configured to prevent online storage abuse, a user account for factors indicating possible account abuse, the factors including at least one of excessive access frequency, excessive download frequency, or number of IP addresses logged into the account;
measuring, by the computing system, an amount of outbound stored data from the user account using one or more processors according to each of a plurality of file types in determining a level of suspicion, one file type being assigned a higher level of suspicion than another file type;
determining, by the computing system, a level of suspicion that file storage space associated with the user account is being abused, the level of suspicion based on the monitored factors and the amount of outbound stored data; and
imposing, by the computing system, a cost on the user account when the account's determined level of suspicion satisfies a threshold, wherein the cost is based on the level of suspicion, and the threshold is based on the number of factors detected by the monitoring.

15. The method of claim 14, wherein the cost further comprises a delay on download requests received through the user account.

16. The method of claim 14, wherein the cost further comprises a human interactive proof.

17. The method of claim 14, wherein the level of suspicion is further based in part upon the amount of stored files copied from the user account per file type.

18. The method of claim 14, wherein the computational puzzles are imposed more frequently as the level of suspicion increases.

19. The method of claim 14, further comprising predicting, by the computing system, the level of suspicion for the user account using machine learning.

20. A computer implemented method of mitigating storage abuse of communication systems, the method operable on a processor, the method comprising:
monitoring, by the processor, a user account for factors indicating a likelihood of an account abuse, the monitored factors including at least one of excessive access frequency, excessive download frequency, or number of IP addresses logged into the account, the monitoring including monitoring at least following situations, wherein the following situations indicate a likelihood of abuse:
a first situation that a user allows another entity to have access to data stored in its native form in the user account;
a second situation that the user allows another entity to have access to data stored in its encoded form in the user account; and
a third situation that the user forwards data stored in its encoded form in the user account to another entity;
employing machine learning to examine collected monitored data;
detecting a level of suspicion associated with the user account based on a plurality of factors, the plurality of factors including:
an amount of outbound data from the user account according to each of a plurality of file types in determining a level of suspicion, one file type being assigned a higher level of suspicion than another file type, the amount of outbound data excluding a new message created from scratch, the amount of outbound data including:
a number of bytes leaving the user account; and
a number of files leaving the user account; and
imposing a cost on the user account when the level of suspicion exceeds a threshold of likelihood of the account abuse, the cost comprising deactivating one or more features of the user account; and a monetary-based fee.

* * * * *